United States Patent [19]
Marsh et al.

[11] Patent Number: 5,848,397
[45] Date of Patent: Dec. 8, 1998

[54] METHOD AND APPARATUS FOR SCHEDULING THE PRESENTATION OF MESSAGES TO COMPUTER USERS

[75] Inventors: Brian D. Marsh; Jon D. McAuliffe, both of New York, N.Y.

[73] Assignee: Juno Online Services, L.P., New York, N.Y.

[21] Appl. No.: 636,745

[22] Filed: Apr. 19, 1996

[51] Int. Cl.⁶ .................................................. G06F 17/60
[52] U.S. Cl. .............................. 705/14; 705/26; 705/30
[58] Field of Search ................................ 705/1, 7, 8, 9, 705/10, 14, 26, 27, 30; 707/10, 501, 573; 345/326, 327, 329, 339, 340, 343, 344, 347; 395/200.3, 200.31, 200.33, 200.42, 200.43, 200.47, 200.49, 200.7

[56] References Cited

U.S. PATENT DOCUMENTS

| | | | |
|---|---|---|---|
| 4,602,279 | 7/1986 | Freeman | 348/10 |
| 4,992,940 | 2/1991 | Dworkin | 705/26 |
| 5,093,918 | 3/1992 | Heyen et al. | 395/200.45 |
| 5,105,184 | 4/1992 | Pirani et al. | 345/115 |
| 5,177,680 | 1/1993 | Tsukino et al. | 704/1 |
| 5,220,501 | 6/1993 | Lawlor et al. | 380/24 |
| 5,233,533 | 8/1993 | Edstrom et al. | 705/8 |
| 5,241,465 | 8/1993 | Oba et al. | 705/8 |
| 5,265,033 | 11/1993 | Vajk et al. | 395/200.36 |
| 5,283,731 | 2/1994 | Lalonde et al. | 705/1 |
| 5,283,856 | 2/1994 | Gross et al. | 395/51 |
| 5,305,195 | 4/1994 | Murphy | 705/1 |
| 5,319,455 | 6/1994 | Hoarty et al. | 348/7 |
| 5,347,632 | 9/1994 | Filepp et al. | 395/200.32 |
| 5,353,218 | 10/1994 | De Lapa et al. | 705/14 |
| 5,361,393 | 11/1994 | Rossillo | 395/651 |
| 5,377,354 | 12/1994 | Scannell et al. | 395/673 |
| 5,404,505 | 4/1995 | Levinson | 707/10 |
| 5,414,773 | 5/1995 | Handelman | 380/49 |
| 5,426,594 | 6/1995 | Wright et al. | 395/200.36 |
| 5,428,606 | 6/1995 | Moskowitz | 370/400 |
| 5,434,978 | 7/1995 | Dockter et al. | 395/200.6 |
| 5,442,771 | 8/1995 | Filepp et al. | 395/200.49 |
| 5,446,919 | 8/1995 | Wilkins | 455/6.2 |
| 5,483,466 | 1/1996 | Kawahara et al. | 395/200.33 |
| 5,664,948 | 9/1997 | Dimitriadis et al. | 434/307 R |

OTHER PUBLICATIONS

Williamson; "This E–mail Message in Brought to You By . . . ", *Advertising Age*; v66 n16; Apr. 17, 1995; p. 16.

"ZD Net Celebrates First Year of Web Advertising Program as Top–Grossing Content Provider with 63 Apr. Advertisers"; *PR Newswire*; Cambridge, Mass.; Apr. 15, 1996; Dialog: File 621, Acc# 00602035.

(List continued on next page.)

*Primary Examiner*—Stephen R. Tkacs
*Attorney, Agent, or Firm*—Kenyon & Kenyon

[57] ABSTRACT

The present invention provides a method and apparatus for scheduling the presentation of a continuously-changing display to computer users, and is particularly well-suited for use in an advertisement-supported e-mail service. An advertisement display scheduler resident on a user's computer receives advertisements from a server system over a network. Upon receipt, the advertisement display scheduler determines the priority of the advertisement and assigns it to one of a plurality of prioritized advertisement queues. Each queue is sorted according to predetermined scheduling criteria so that advertisements deemed "more important" are presented to a user first. The advertisement display scheduler logs statistical information relating to the presentation of advertisements for use in updating the scheduling criteria, and makes such statistical information available to the server system.

48 Claims, 8 Drawing Sheets

OTHER PUBLICATIONS

"Online Interactive's FreeShop Online Achieves One Million Electronic Orders—An Industry Milestone"; *Business Wire*; Seattle; Feb. 7, 1996; Dialog: File 621, Acc# 00575091.

Derringer, Pam, "Freemark Delays Release of Free E–Mail Until Apr." *Mass High Tech*, Feb. 19, 1996.

Gallagher, Suzanne E., "Pressing E–Mail's Mass–Market Advantage," *D M News*, Mill Hollow Corporation, Nov. 27, 1995.

Wilder, Clinton, "Free E–Mail—For A Price," *Information Week*, Nov. 27, 1995.

"Free e–mail service launched by FreeMark," *Link Up*, Oct. 1995.

Soltes,Fiona, "Hanging 10 on the Internet not as costly as you might think," *The Tennessean*, Aug. 16, 1995.

Mohan, Suruchi, "Firm to offer free 'net mail," *Computerworld*, Jul. 10, 1995.

Abate, Tom, "Advertising Sponsorship is growing on the Internet," *The Middletown Press*, Jul. 1, 1995.

O'Connor, Rory ., "Ads to pay for free e–mail service," *Calgary Herald*, Jun. 29, 1995.

Harler, Curt, "Distribute Coupons Via E–Mail," *R I S/Retail Info Systems News*, Jan. 1996.

Mohan, Suruchi, "Free Mail on the net forces users to trade off privacy," *Computerworld*, Nov. 27, 1995.

Corcoran, Elizabeth, "The Marketers are On–Lining Up for You," *Washington Post*, Sep. 27, 1995.

Memon, Farhan, "Free E–Mail is here but with ads aplenty," *New York Post*, Jul. 27, 1995.

Wingfield, Nick, "Juno Offers free E–mail service to end–users," *Infoworld*, Jul. 10, 1995.

"Their e–mail could become free mail," *The Record*, Jul. 7, 1995.

Schoenfeld, Adam et al., "Developers Plan Free E–Mail," *Online Marketplace*, Jun. 1995.

Pizzo, Stephen, "On–Line Mortgage Service Will Operate Over Internet," *National Mortgage News*, Oct. 31, 1994.

"Getting Wired With St," *Sunday Times*, Jan. 22, 1995.

"W3.COM Introduces First visitor–Tracking Software For Web Sites," *Business Wires*, Aug. 15, 1995.

"Freeloader, Inc. Announces The First Service Too Deliver The Internet Offline," *PR Newswire*, Jan. 19, 1996.

"Individual Launches Newspage Direct," *PR Newswire*, Feb. 9, 1996.

Jaffee, Larry, "No Shortage of Online Choices," *DM News*, Mill Hollow Corporation, Feb. 6, 1995.

Mohan, Suruchi, "Firm to Offer Free Net Mail," *Computerworld*, Jul. 10, 1995.

O'Connor, Rory J., "Free e–mail Service Slated For The Fall; Limited Urban Areas To Try Out Advertiser–Supported Messaging Service," *Austin American–Statesman*, Jul. 1, 1995.

"Productview Interactive To Launch Free EMail Service This Year," *M2 Communications, M2 Presswire*, Jun. 28, 1995.

Corcoran, Elizabeth, "The Marketers Are On–Lining Up For You; Interactive Ads, Other Gimmicks Kick Off the Internet's New Era," *The Washington Post*, Sep. 27, 1995.

"FreeMark Communications and SportsTicker enter online sports information distribution agreement; Popular sports content first of a series of innovative content offerings to be delivered free to email users," *Business Wire*, Jan. 30, 1996.

"FreeMail, Part Two, Two Companies Announce Free Internet E–Mail Services," *Multimedia & Videodisc Monitor*, Information Access Company, Aug. 1995.

5,848,397

METHOD AND APPARATUS FOR SCHEDULING THE PRESENTATION OF MESSAGES TO COMPUTER USERS

COPYRIGHT NOTICE

This patent document contains material subject to copyright protection. The copyright owner has no objection to the reproduction of this patent document or any related materials in the files of the United States Patent and Trademark Office, but otherwise reserves all copyrights whatsoever.

BACKGROUND OF THE INVENTION

The present invention relates generally to the field of computer networking, and specifically to a system by which users of on-line computer networks may be exposed to a continuously-changing variety of advertisements. The invention is particularly well-suited for providing advertising to users of electronic mail systems while such users are not connected to an on-line network.

Electronic mail, or "e-mail," is an increasingly popular way for people to communicate. E-mail allows a person to quickly and easily send textual messages and other information (e.g., pictures, sound recordings, formatted documents) electronically to other e-mail users anywhere in the world.

An e-mail user will typically create a message using an e-mail program running on a computer connected to a computer network through a modem. The message will include an e-mail "address" for the intended recipient. When the user has finished entering the message, the user may "send" the message to the intended recipient. The e-mail program then electronically transmits the message over the computer network. The recipient, using an e-mail program running on his or her own computer, can then "receive" the message.

In recent years the Internet has become the most popular computer network used by consumers and businesses to send and receive e-mail. The Internet allows users to readily send and receive e-mail to and from computers around the world. Each user typically has a unique Internet e-mail address (e.g., bob@pto.com). A user with an e-mail account and a computer capable of connecting to the Internet can easily send and receive e-mail over the network.

Users desiring to connect to the Internet to send and receive e-mail are faced with an ever-increasing variety of service options. For example, a user can subscribe to a proprietary on-line network such as Prodigy, America Online, Compuserve or Microsoft Network. Using a standard personal computer equipped with a modem, the user dials an access number to connect to proprietary on-line network. The user can then send and receive e-mail to and from other users of that proprietary network and, provided that the network is connected to the Internet, with any other user having an Internet e-mail address.

An alternative method for accessing the Internet is through an Internet Service Provider. Again using a modem, the user dials the access number of an Internet Service Provider to establish a connection with a computer "directly" connected to, or part of, the Internet. The user can then use an e-mail program, such as Eudora, to send and receive e-mail over the Internet.

The foregoing are merely examples of the ways that users can establish a connection with on-line networks to send and receive e-mail. Many other access methods exist today, and others will continue to become available as use of the Internet becomes more and more common. The present invention is not dependent upon any particular access method.

A major disadvantage of existing e-mail systems, at least from the standpoint of the user, is that the user must pay for the e-mail service. For example, proprietary on-line networks and Internet Service Providers charge users in a number of ways, including monthly access fees, hourly connect fees, fees charged on a per-message basis, and fees based on the number of characters sent by e-mail. Providing reliable e-mail service is costly in view of hardware, software and communication requirements.

A system for providing e-mail service to users is described in co-pending U.S. patent application Ser. No. 08/948,779 entitled "Electronic Mail System with Advertising" in the name of David E. Shaw, Charles E. Ardai, Brian D. Marsh, Mark A. Moraes, Dana B. Rudolph and Jon D. McAuliffe, filed concurrently herewith. In that system, the cost of providing e-mail service need not be recouped from individual users, but rather, can be recouped from advertisers. The specification of that application is expressly incorporated herein by reference in its entirety.

Apart from the Applicants' innovative e-mail system, some on-line service providers also display advertising to their users. For example, the America Online network displays advertisements to users on a portion of their computer screen. Likewise, advertisements are often included as part of web pages seen by users when accessing certain World Wide Web sites on the Internet. Often in such systems, every user accessing a certain screen or site is shown the same advertisement. More sophisticated systems have the capability to change an advertisement after a certain period of time. Nevertheless, such systems generally require that the user be connected to the on-line network to view the advertisements.

With many existing on-line networks, users must be connected to the on-line network to read and write e-mail messages. This is undesirable for several reasons. From the service provider's view, operating costs (including communication and hardware costs) are necessarily higher when users are connected to network. From the user's view, many on-line service providers charge fees based on connect time. Accordingly, it is more cost-effective if e-mail users read and write their messages when off-line (i.e., when not connected to the on-line network), and only connect to the on-line network to actually send and receive e-mail messages (i.e., uploading messages to the network and downloading messages from the network).

Encouraging e-mail users to minimize on-line access is problematic for on-line service providers and their advertisers because existing systems do not permit advertisements to be displayed and/or updated when the user is off-line. Thus, even if an advertisement was downloaded to a user during a period of on-line access, the advertisement could become "stale." Advertisers would run the risk of users being numbed or otherwise negatively affected by their advertising as a result of overexposure. Accordingly, there is a need for a system whereby users of on-line networks can be exposed to a dynamic display of advertisements while the users are not connected to the on-line network.

Accordingly, there is a need for a system that schedules the distribution, downloading and display of advertisements to users of remote computers that maximizes advertiser revenues but minimizes system costs.

SUMMARY OF THE INVENTION

The present invention provides a method and apparatus for scheduling the distribution, downloading and presentation of a continuously-changing display to computer users. The invention is particularly well-suited to presenting advertisements to users of an electronic mail service, thereby eliminating the need to charge the users for the service.

In a representative embodiment of the present invention, an advertisement display scheduler resides on a user's computer (i.e., a client system) and manages the presentation of advertisements to the user. The advertisement display scheduler receives advertisements from a server system which communicates with the client system over a computer network.

The server system includes an advertisement distribution scheduler which determines the advertisements that are eligible for distribution to each user. The advertisement distribution scheduler may be used to target advertisements to particular users based on demographic information stored in a database management system resident on the server system. Demographic information may be obtained, for example, by having a user complete a survey, or member profile, when first accessing the client system (and upon later updates by the user). The member profile may include such information as the user's hobbies, interests, employment, education, sports, age and gender. The member profile would be transmitted for storage in the database management system the first time the user establishes a connection to the server system. This feature is particularly useful for targeted advertising.

The server system also includes an advertisement download scheduler which determines when the advertisements are transferred to each user. The advertisement download scheduler may ensure, for example, that high-priority advertisements are transmitted to a user before low-priority advertisements. Likewise, the advertisement download scheduler manages the number of advertisements that are transmitted at any given time, so that the user is not forced to wait unnecessarily for a long transmission of advertisements when there is no other need to be on-line.

Significantly, the advertisements to be shown to system users are not in any way correlated with a user's e-mail. Thus, the advertisements can be regarded as context independent. The e-mail messages come from a different source than that of the advertisements (e.g., e-mail messages originate from other network users, while the advertisements may originate from advertisers). There need not be any correlation between the number of e-mail messages sent and/or received and the number of advertisements transferred to or stored at the client computer. Indeed, in a representative embodiment, the advertisements are stored at the client computer in a different subdirectory from the e-mail messages, and are not linked to any particular e-mail message or messages. Control of the display of e-mail messages is likewise independent from the control of the presentation of advertisements; that is, the client program determines which advertisements to present and when, whereas the user determines which e-mail messages to read/write and when.

Upon receipt of an advertisement from the server system, the advertisement display scheduler determines the priority of the advertisement and assigns it to one of a plurality of prioritize advertisement queues (e.g., HIGH_PRIORITY, MEDIUM_PRIORITY, LOW_PRIORITY, NO_PRIORITY). Each of these priority queues are sorted according to predetermined scheduling criteria so that advertisements deemed to be "more important" are presented to a user first.

In one embodiment, the scheduling criteria for the advertisements include the time to expiration, time since last seen, maximum exposures to a user, and percentage of exposures remaining. The scheduling criteria are selected with the goal of maximizing the revenue to the e-mail service provider, subject to a "no starvation" constraint, in view of the particular billing arrangements with the vendors associated with the advertisements.

The advertisement display scheduler computes a partial ordering (i.e., which should come first) between all pairs of advertisements in the advertisement queues. Such an ordering is sufficient to determine a total ordering on the entire set of advertisements. To determine which of two advertisements should be presented first, the advertisement display scheduler computes a difference, or "delta," between the two advertisements with respect to a predetermined set of weighted scheduling criteria. The algebraic sign of the sum of these differences indicates which of the advertisements should be shown first.

The advertisement display scheduler of the present invention is capable of presenting a number of different types of advertisements to users according to the present status of the client system. For example, when the user is reading or writing e-mail messages, the advertisement display scheduler continuously presents a series of "banner advertisements" which appear above the workspace on the user's video monitor. When a connection to the server system is being established or during the retrieval of e-mail messages from the server system, the advertisement display scheduler additionally presents a series of "showcase advertisements" which occupy most or all of the workspace.

The advertisement display scheduler includes the ability to log statistics relating to the presentation of advertisements to users. For example, the advertisement display scheduler can track the number of times a given advertisement has been presented, and the period of time between presentations and user interaction with an advertisement (e.g., "clicking" on the advertisement to receive additional information). Such information is used by the advertisement display scheduler itself to update the scheduling criteria for the various advertisements, and is reported back to the server system for use in billing vendors.

Various features and advantages of the present invention are described below with reference to the drawings. Other features and advantages will be readily apparent to those skilled in the art.

DETAILED DESCRIPTION

The present invention is a scheduler system for use in controlling the selection, downloading and presentation of advertisements to users of a computer system. The invention is described in the context of an e-mail system having both client and server components. An advertisement display scheduler of the present invention is a client-based application, receives advertisements periodically from the server component, and determines when advertisements should be output. The server component includes an advertisement distribution scheduler, which determines the advertisements eligible for distribution to a user, and an advertisement download scheduler, which determines how and when advertisements are downloaded to the client system. The various components of these schedulers are described below, along with the underlying e-mail system in which these schedulers are incorporated.

Although the terms "client" and "server" are used herein to describe representative embodiments, the present invention is in no way limited to the architecture known in the art as a "client/server network."

The E-Mail System

Figure 1:
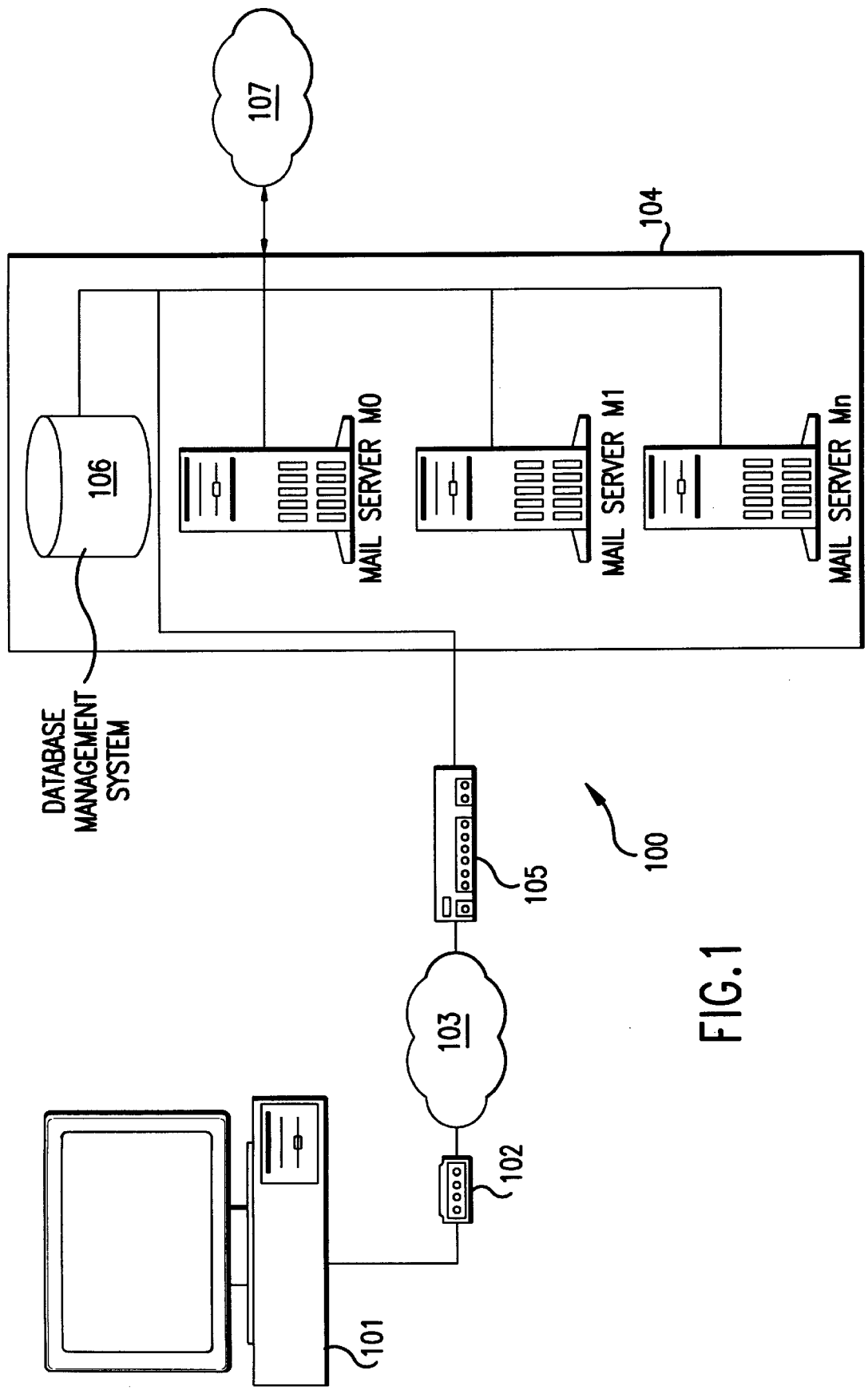
FIG. 1 is a block diagram of an exemplary e-mail system of a type to which an advertisement display scheduler configured according to the present invention may be applied.

Referring to FIG. 1, an exemplary e-mail system 100 of the type to which the present invention may be applied includes a client system 101 and a server system 104 which communicate with one another over a network 103. The client system 101 may be a workstation, personal computer or any other processor-based system capable of supporting at least one system user.

The client system 101 is connected to a communication interface 102 for allowing the client system 101 to communicate with other computer systems. As illustrated, the communications interface 102 is external to the client system 101, but an internal communications interface 102 is equally acceptable. Also, while the communications interface 102 of FIG. 1 is a modem intended to provide communication connectivity to remote systems via a network 103, such as a privately switched telephone network (PSTN), the communications interface 102 could alternatively be a network interface unit, a network card or some other comparable device providing connectivity to other computer systems over a network using such protocols as X.25, Ethernet, or TCP/IP.

Using the communications interface 102, the client system 101 selectively communicates with the server system 104 over the network 103 through a communications server 105. In the disclosed configuration, the communications server 105 couples the client system 101 to one of a plurality of mail servers $M_0 \ldots M_n$ that form the server system 104.

Figure 2:
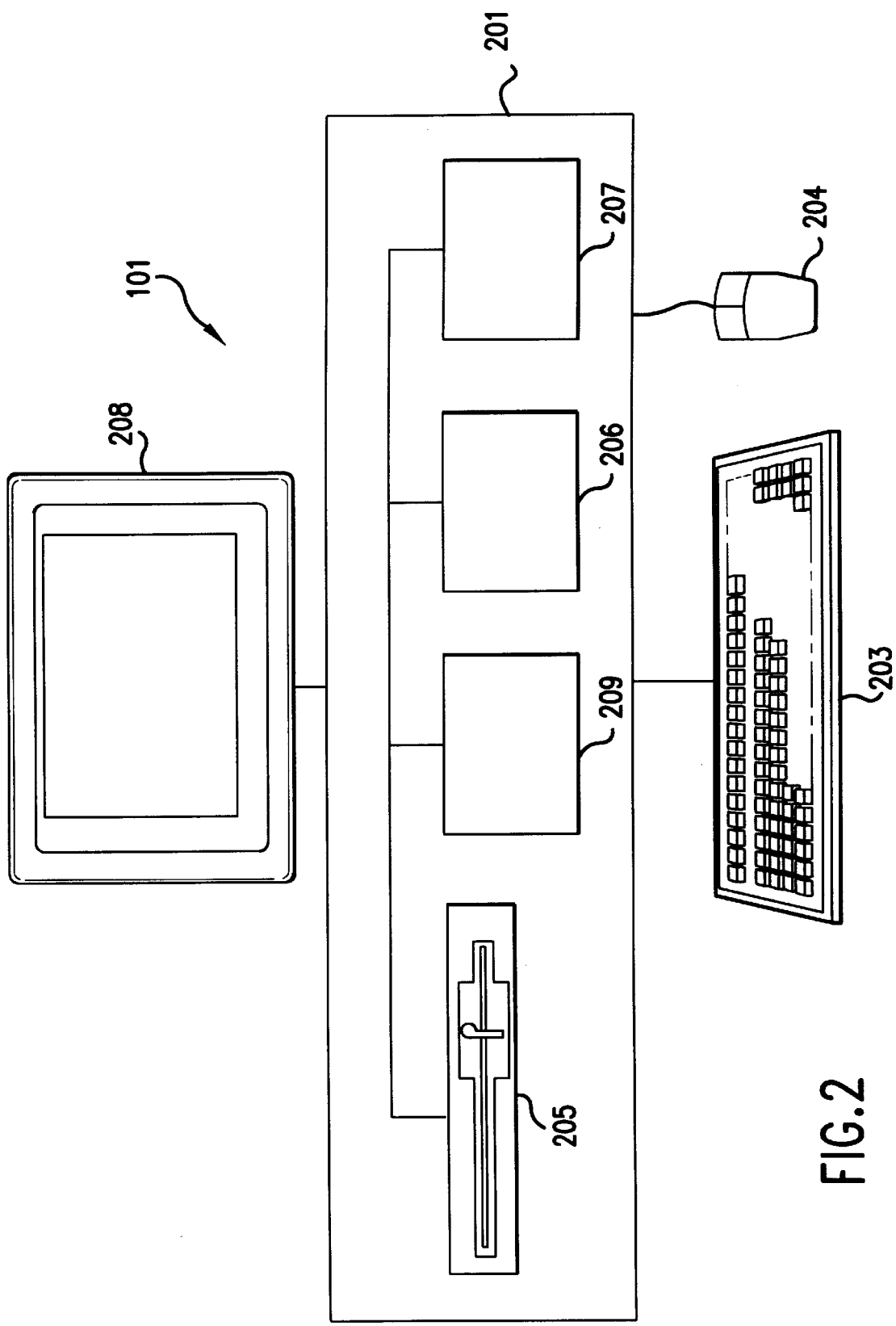
FIG. 2 is a block diagram of exemplary client system hardware which may be used in conjunction with the exemplary e-mail system.

Referring now to FIG. 2, a base unit of the client system 101 includes a central processing unit 209 for executing computer programs and controlling the operation of the client system 101. The base unit also includes a removable storage device drive 205, such as a floppy disk drive, in communication with the central processing unit 209 for reading and writing data and computer programs. A permanent storage device 206 is likewise communicatively connected to the central processing unit 209, and also provides a means for storing computer programs and data. Storage device 206 is ideally a hard disk having a storage capacity of at least twenty (20) megabytes. A dynamic memory device 207 is in communication with the central processing unit 209 for providing temporary storage of computer programs and data.

The client system 101 also has a user interface including a display terminal monitor 208 for displaying graphical and textual information to a user, and input devices such as a keyboard 203 and a mouse 204 permitting the user to communicate with the base unit.

Figure 6:
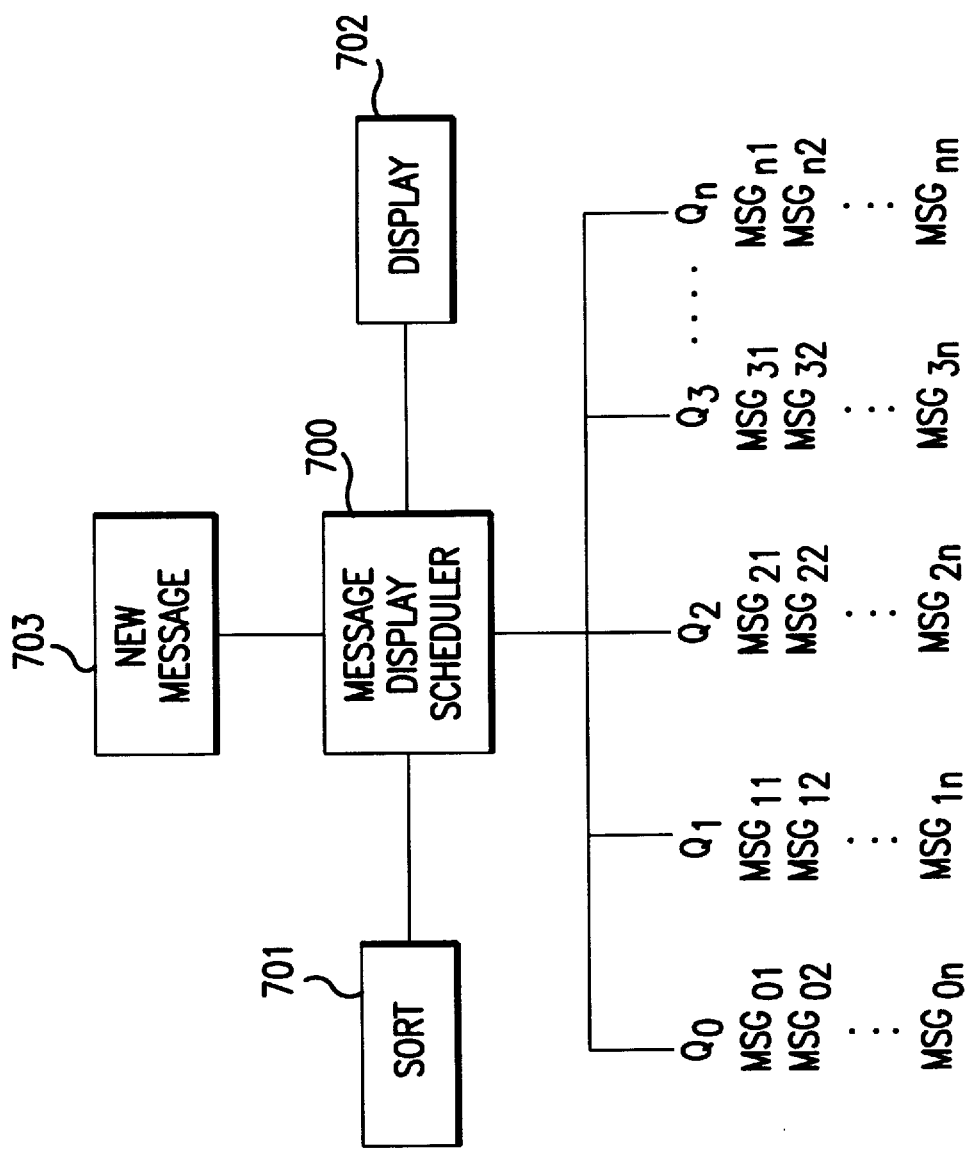
FIG. 6 is a block diagram showing an embodiment of an advertisement display scheduler according to the present invention.

As illustrated in FIG. 6 and explained more fully below, the client system 101 also includes an advertisement display scheduler 700. The advertisement display scheduler 700 can be implemented as a separately-executable software module included in the client system software, and is maintained in the storage device 206 of the client system 101.

Referring again to FIG. 1, the server system 104 communicating with the client system 101 is an electronic mail (e-mail) system which functions as an electronic post office. The server system 104 may receive and deliver e-mail messages addressed to users connected directly or indirectly to it, as well as to non-users through a network 107, such as the Internet. The server system 104 also delivers advertisements for subsequent presentation to the user when the user is not in communication with the server system 104 and/or when information is being transferred between the client system 101 and the server system 104. The server system 104 also includes a plurality of signup servers $S_0 \ldots S_n$ that are used when the user first establishes an account with the server system 104.

As explained in more detail below, in the representative embodiment, the advertisements may be presented to the user as either "banner advertisements" or "showcase advertisements." The presentation of the advertisements is controlled by the advertisement display scheduler 700 configured according to the present invention.

The server system 104 includes a database management system 106 in communication with each of the plurality of mail servers $M_0 \ldots M_n$. The database management system 106 stores various information related to advertisements (e.g., vendor identification, billing information, target demographics), and information regarding system users. The database management system 106 may have a hardware configuration similar to the mail servers $M_0 \ldots M_n$, but ideally includes a plurality of high-capacity storage devices. Alternatively, the database management system 106 may be a distributed system comprising a plurality of file servers, each operating on a hardware configuration similar to that of the mail servers $M_0 \ldots M_n$.

Referring again to FIG. 2, in order to operate the client system 101, a user must first load the client system software onto the client system 101 using, for example, an installation program stored on a floppy disk that is readable by the removable storage device driver 205. Once installed, the user can initiate local execution of the client system software.

The client system software may execute in a GUI environment, such as that provided by Microsoft Windows. In the GUI environment, the user may use the mouse 204 to "click" on an icon representing the client system software, thereby initiating execution.

Presentation of Advertisements

According to an embodiment of the present invention, two types of advertisements are presented to users of the client system 101: banner advertisements and showcase advertisements. The primary vehicle for presenting information, such as advertisements, to users during periods of off-line activity is the banner advertisement. Showcase advertisements are typically used to present information to users while a connection is being established with the server system 104 and while information (including e-mail messages and advertisements) are being transferred between the client computer 101 and the server system 104.

Figure 3:
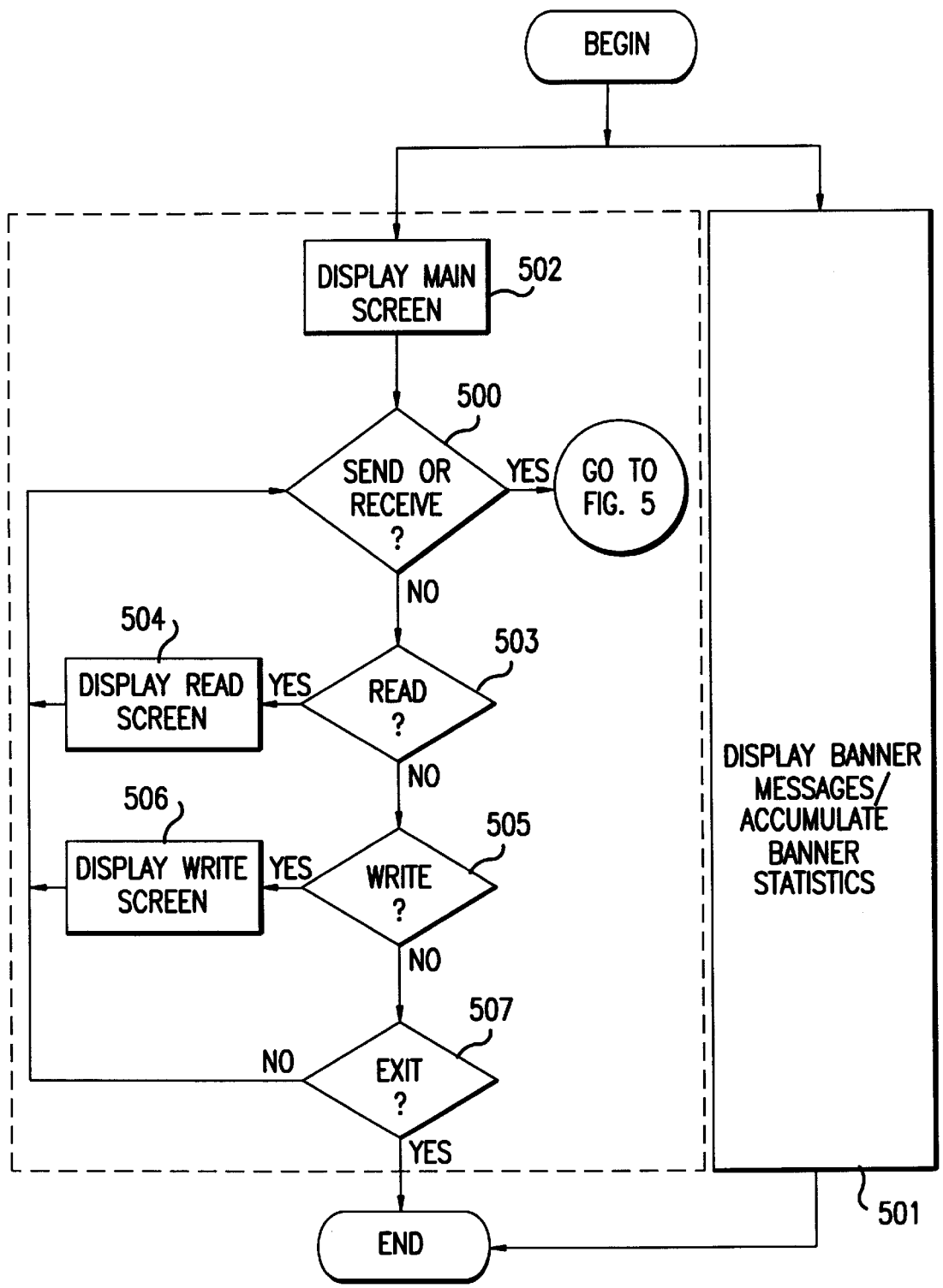
FIG. 3 is a flowchart describing the basic processing of the client system software for the exemplary e-mail system.
Figure 5:
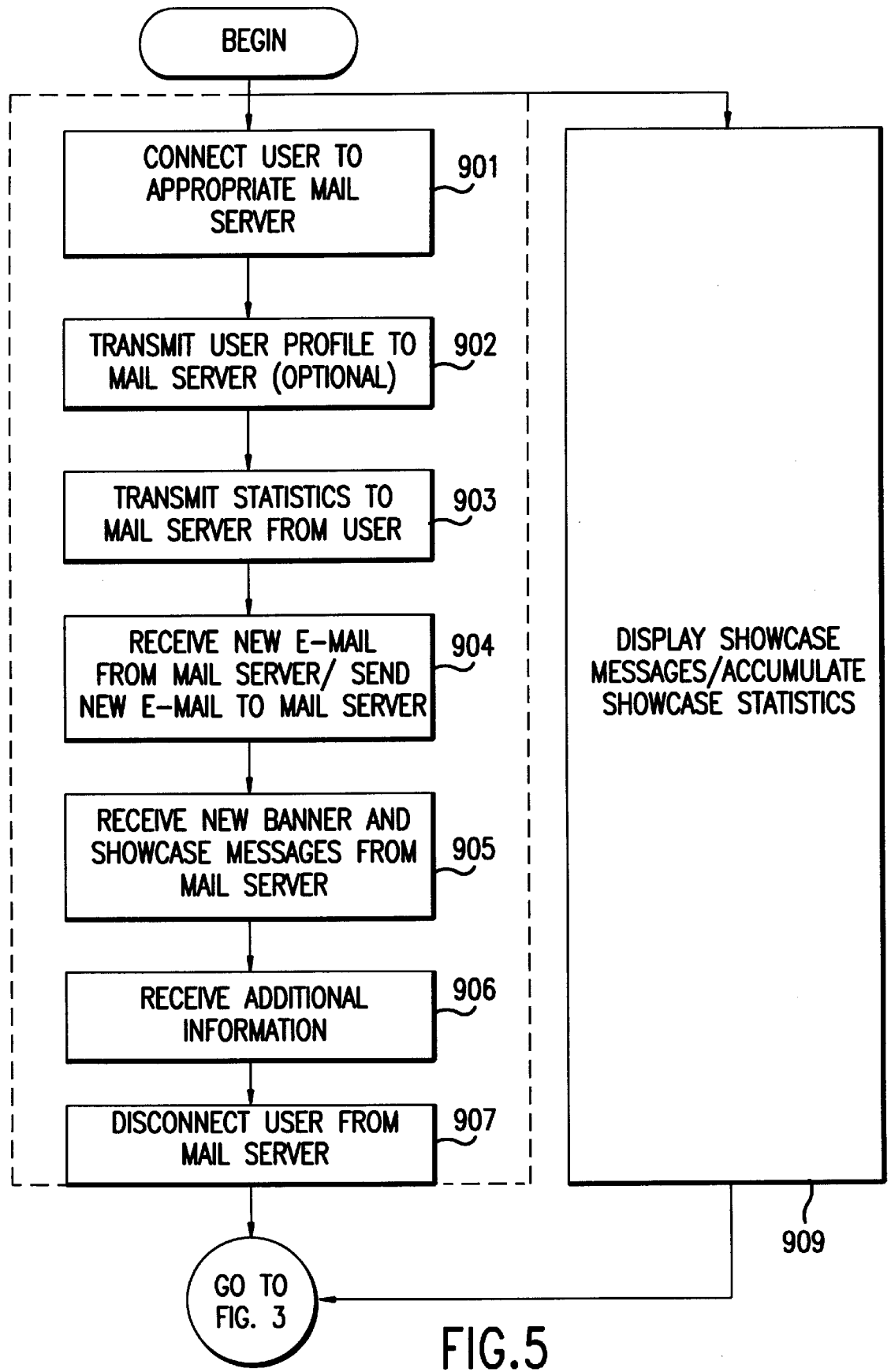
FIG. 5 is a flowchart describing the process by which e-mail is retrieved by the client system of the exemplary e-mail system.

The flowchart of FIG. 3 illustrates the basic processing of the client system 101 following completion of installation and initial user setup procedures (e.g., automatic configuration of the user's modem to communicate properly with the server system 104, activation of a new user account, completion of a user profile to provide demographic information for targeted advertising). The client system 101 continuously displays banner advertisements on a predetermined portion of the display terminal monitor 208 concurrently with the operation of the client system (step 501), and records statistical information relating to the display (e.g., what advertisements were shown and for how long). For example, the banner advertisements are displayed whenever the user is using the client system to read or write e-mail messages. As shown in FIG. 3, which is a flowchart describing the basic processing of the client system software for the exemplary e-mail system, when the process begins, banner messages may be displayed and banner statistics may be accumulated (step 501). The process may also concurrently display a main screen (step 502) and determine if e-mail is to be sent or received (step 500). If e-mail is to be sent or received, the process described in detail with respect to FIG. 5 is performed. If e-mail is not to be sent or received, the process may determine if e-mail is to be read (step 503). If e-mail is to be read, the read screen is displayed (step 504) and the process continues at step 500. If e-mail is not to be read, the process may determine if e-mail is to be written (step 505). If e-mail is to be written, the write screen is displayed (step 506) and the process continues at step 500. If e-mail is not to be written, the process may determine whether to exit (step 507). If the process determines to not exit, the process continues at step 500. If the process determines to exit, the process ends.

Figure 4:
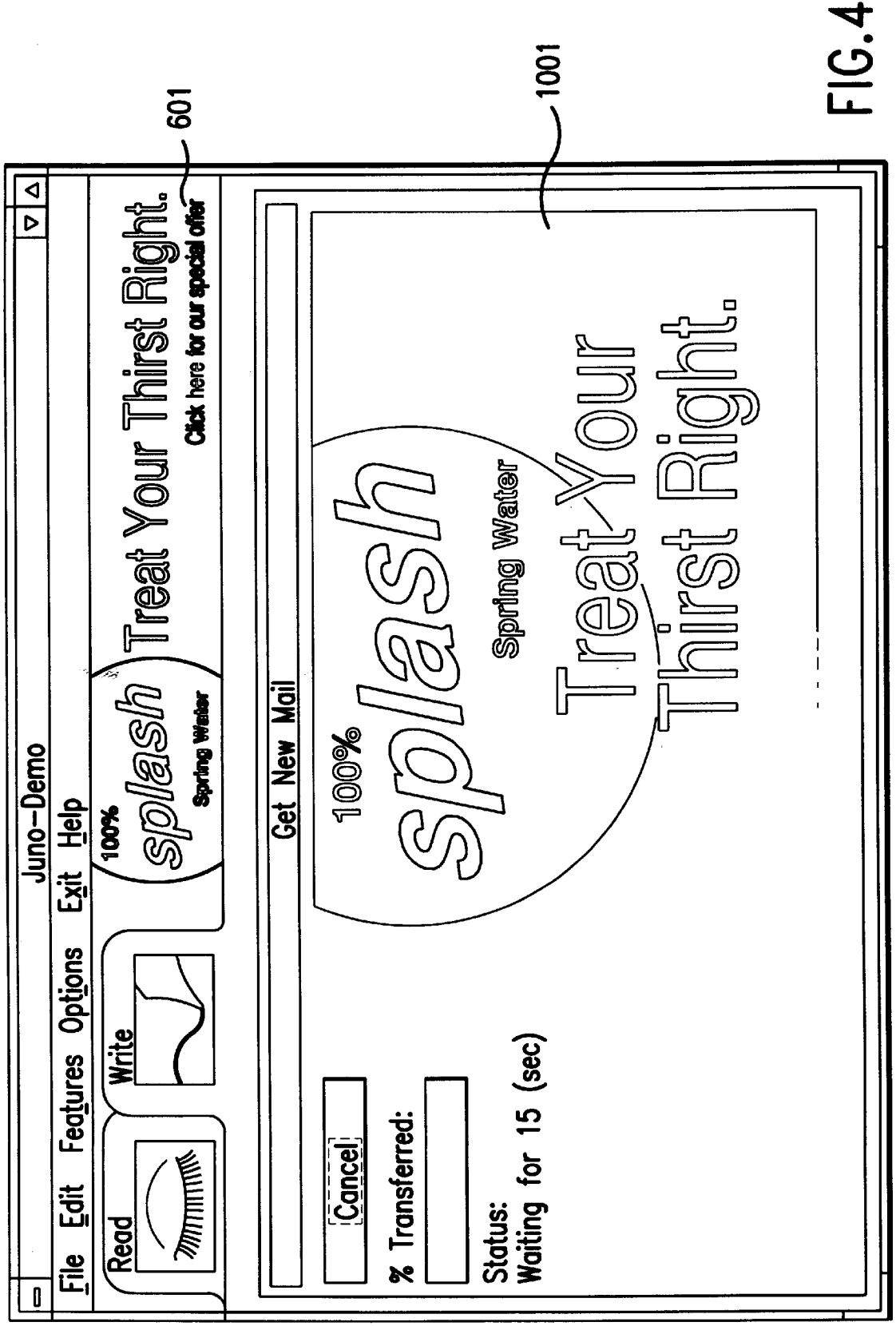
FIG. 4 illustrates a preferred placement of advertisements presented by the advertisement display scheduler of the present invention.

FIG. 4 provides an example of a display terminal monitor 208 showing a banner advertisement 601. The banner advertisement 601 is positioned prominently, but relatively unobtrusively, in the upper right-hand portion of the video display. The banner advertisement 601 can be replaced or updated by another one of a plurality of stored advertisements after a predetermined period of time has elapsed. Replacing the display (or other output) of an advertisement with the display (or other output) of another advertisement can take place while the client computer 101 is not connected to the server system 104. The advertisements that are retrieved from memory of the client computer 101 prior to output.

The banner advertisement 601 may be interactive. For example, by clicking on a specified portion of the banner advertisement 601, the user may be provided with additional information concerning the subject matter of the banner advertisement 601. Likewise, the user may access an e-mail message template including the e-mail address of a vendor associated with the banner advertisement 601 being displayed, so that the user may easily forward comments or requests for additional information. Clicking on the banner advertisement 601 may also cause an e-mail message to be automatically completed (including the message text) and either transmitted immediately to the vendor or stored in an "outbox" for later transmission.

Showcase advertisements 1001 can be displayed in addition to the previously-described banner advertisements 601 during periods of on-line activity; for example, during the entire time that the client system 101 is establishing communications and actually communicating with the server system 104. The flowchart of FIG. 5 illustrates one such period when showcase advertisements are displayed; that is, during performance of a "Get New Mail" function of the client system 101. As shown in FIG. 5, which is a flowchart describing the process by which e-mail is retrieved by the client system of the exemplary e-mail system, when the process begins, showcase messages may be displayed and showcase statistics may be accumulated (step 909). The process may also concurrently connect a user to an appropriate mail server (step 901). The process may then optionally transmit a user profile to the mail server (step 902) and transmit statistics to the mail server from the user (step 903). The process may also receive new e-mail from the mail server and send new e-mail to the mail server (step 904). In addition, the process may receive new banner and showcase messages from the mail server (step 905) and receive additional information (step 906). Finally, the process may disconnect the user from the mail server (step 907), and the process described in detail with respect to FIG. 3 may be performed.

Referring again to the video display mock-up of FIG. 4, a showcase advertisement 1001 is a relatively large advertisement that can occupy the entire primary operational portion of the video display. Like the banner advertisement 601, the showcase advertisement 1001 can be replaced after a predetermined period of time with a different showcase advertisement.

Schedulers

According to the representative embodiment of the present invention, the client system 101 includes an advertisement display scheduler that controls the display of both the banner advertisements 601 and the showcase advertisements 1001. Referring to FIG. 6, the advertisement display scheduler 700 can be configured as a software module included in the client system software and includes a new advertisement routine 703, a sort routine 701 and a display routine 702. The advertisement display scheduler 700 likewise maintains a plurality of advertisement queues $Q_0 \ldots Q_n$, each of which contains a plurality of advertisements (e.g., $MSG_{01} \ldots MSG_{0n}$). The advertisement queues $Q_0 \ldots Q_n$ can be maintained in the storage device 206.

The advertisement display scheduler 700 receives digital representations of banner advertisements and showcase advertisements from the server system 104. Each advertisement transmitted to the client system 101 includes control information, such as the expiration date for the advertisement and the maximum number of times the advertisement may be shown to a user, along with a priority assigned by the server system (e.g., HIGH, MEDIUM, LOW, NO). Upon receipt of a given advertisement, the advertisement display scheduler 700 assigns the advertisement to one of the plurality of advertisement queues $Q_0 \ldots Q_n$ according to its previously-assigned priority. The advertisement queues $Q_0 \ldots Q_n$ reside in a designated portion of the storage device 206 having a predetermined memory capacity (e.g., 10 MB) which is specifically reserved for storage of advertisements at the time the client system software is installed.

Figure 7:
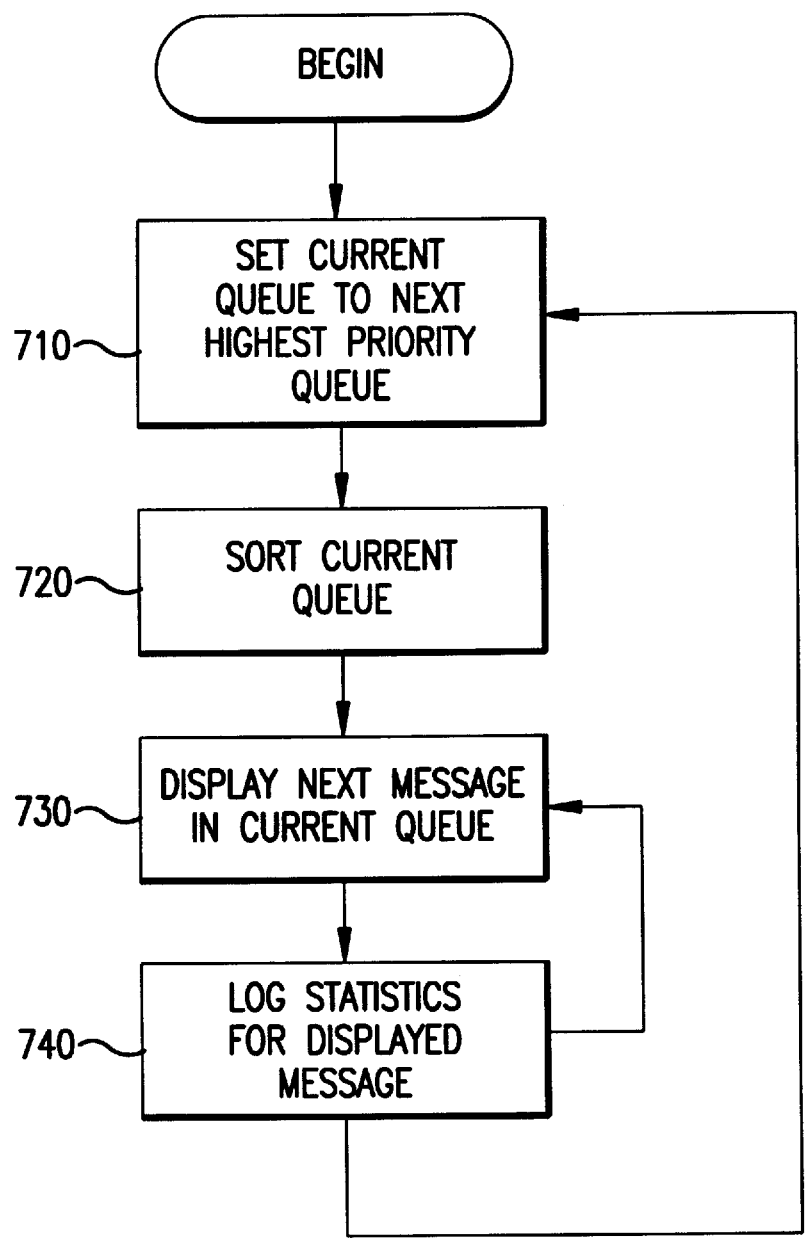
FIG. 7 is a flowchart describing the high-level processing of an embodiment of the advertisement display scheduler of the present invention.

The flowchart of FIG. 7 illustrates the basic processing used by the advertisement display scheduler 700 to determine the order in which advertisements, and particularly banner advertisements, are shown to a system user. The advertisement display scheduler 700 first designates the highest priority advertisement queue (e.g., $Q_0$) as the current advertisement queue (step 710). The sort routine 701 of the advertisement display scheduler 700 then sorts the advertisements in the current queue according to predetermined characteristics of the advertisements, as is more fully described below (step 720).

Once the current advertisement queue is fully sorted, the display routine 702 of the advertisement display scheduler 700 steps through the queue, sequentially presenting each advertisement for a predetermined period of time until all of the advertisements in the current advertisement queue have been shown (step 730), logging statistics with respect to each advertisement actually shown (step 740). The method of displaying information on a video monitor is well-known in the art, and thus is not described herein. When the current advertisement queue has been exhausted, the advertisement display scheduler 700 designates the next-highest priority queue (e.g., $Q_1$) as the current queue and repeats the processing.

In general, the advertisement display scheduler 700 continuously loops through the basic processing illustrated in FIG. 7 as long as the client system 101 is running. When the advertisement display scheduler 700 has completed presenting all of the advertisement in its lowest-priority queue (e.g., $Q_n$), the queue processing simply returns to the beginning and again designates the highest-priority queue as the current advertisement queue.

In a representative embodiment, the advertisement display scheduler 700 monitors the client system 101 for extended periods of inactivity (i.e., the time between key strokes) and "times out" if there is no activity within a predetermined period of time (e.g., five minutes). This is a highly-desirable feature from the standpoint of advertisers, who understandably do not want to be billed for advertisements that are presented on an unattended video display monitor. Conversely, this feature provides advertisers with a relatively high degree of assurance that a user has actually viewed the images presented by the advertisement display scheduler 700.

As noted above, the advertisement display scheduler 700 of the present invention sorts the current advertisement queue according to certain predetermined characteristics of the advertisements contained therein. In the representative embodiment, these characteristics are time to expiration (tte), time since last seen (tsls), maximum exposures (me) and percent remaining exposures (pre); however, other characteristics could similarly be used depending on the requirements of any particular application.

A goal of the sorting process is to maximize the revenue that may be generated from each advertisement given the particular billing arrangements with the associated vendors, subject to a "no starvation" constraint. "Starvation" in this context refers, for example, to an advertisement reaching its expiration date without having reached its maximum number of exposures. (It will be appreciated that there is a cost in transferring advertisements from the server system 104 to client computers 101.) A less lucrative advertisement may be favored over a more lucrative advertisement if that less lucrative advertisement is nearing expiration. Yet another constraint on the sorting process may be that an advertisement nearer to reaching its maximum exposures is favored to make room in the advertisement queues for potentially more-lucrative advertisements.

The advertisement display scheduler 700 may also advantageously facilitate separation of particular advertisements. For example, a given advertisement may have associated with it one or more other advertisements with which it is mutually exclusive (e.g., advertisements relating to competing products of another vendor). In such a case, the advertisement display scheduler 700 may determine the appropriate order for a given advertisement queue and then make a pass through the sorted advertisement queue to eliminate conflicting advertisements. A list of excluded advertisements may be included as part of the scheduling criteria associated with each advertisement. Advertisement separation performed by the advertisement display scheduler 700 may also include a time component. For example, once a first advertisement is output, a second advertisement for a competing produce will not be output for a period of time, e.g., seven days. In the representative embodiment, the period of time for separation is one pass through the advertisement queue. Thus, the period of separation can be determined dynamically based upon the length of time that the user utilizes the system. The process of excluding advertisements from a given queue based upon other advertisements can take place either before or after the sort routine 701.

The sort routine 701 of the advertisement display scheduler determines the order in which the advertisements in the current advertisement queue are presented to a user. The sort routine 701 may employ any suitable technique, such as a queue insert or a bubble sort. Such techniques are well known in the art, and thus are not described in detail herein. Moreover, the present invention does not depend on the use of any particular sorting technique.

Conceptually, the sort routine 701 views the set of possible values for each of the four scheduling criteria (i.e., tte, tsls, me, pre) as defining a four-dimensional space. Each scheduling criterion is associated with a corresponding weighting constant as follows:

$c_1$=TTE_WEIGHT $c_2$=TSLS_WEIGHT $c_3$=TE_WEIGHT $c_4$=PRE_WEIGHT

These constants, which are assigned predetermined values as described below, may then be used to construct a separating hyperplane through the origin defined by the following hyperplane equation:

$$(c_1 {}^*x_1)+(c_2{}^*x_2)+(c_3{}^*x_3)+(c_4{}^*x_4)=0,$$

where:

$x_1$=tte $x_2$=tsls $x_3$=me $x_4$=pre

The separating hyperplane divides the four-dimensional space into two halves: one half when the first of the two advertisements being sorted should be presented first, and one half when the second of the two advertisements should be presented first. In the representative embodiment, a negative result for the hyperplane equation is arbitrarily defined to mean that the first advertisement should be shown before the second advertisement, and a positive result means the second should be shown before the first. By substituting the delta values computed for $x_1$ through $x_4$ (using the values for each advertisement as maintained by the advertisement display scheduler 700) and the predetermined values for $c_1$ through $c_4$ into the hyperplane equation, it is possible to determine where the total difference between the two advertisements lies with respect to the hyperplane, thus deciding the order in which the advertisements should be presented by the advertisement display scheduler 700.

The values of the four weighting constants ($c_1 \ldots c_4$) orient the separating hyperplane in the four-dimensional space, thus completely determining the behavior of the hyperplane equation and, in turn, the sorting of the current advertisement queue. The signs of the weighting constants play an important role in determining the order in which advertisements are presented. In the representative embodiment, the signs of the weighting constants are set as follows:

| Factor | Sign | Rationale |
|---|---|---|
| TTE_WEIGHT | + | If the first advertisement expires sooner than the second, the delta is negative (i.e., favors the first advertisement). Since it is desirable to complete the maximum exposures before expiration of an advertisement, the sign is not changed. |
| TSLS_WEIGHT | − | If the first advertisement was seen more recently, the delta is negative (i.e., favors the first advertisement). Since it is desirable to present the advertisement which has not been seen recently, the sign of the delta is changed to favor the second advertisement. |
| ME_WEIGHT | + | If the first advertisement has fewer total exposures, the delta is negative (i.e., favors the first advertisement). Since completing all of the exposures of the first advertisement is easier to do because its maximum is lower, presenting the first advertisement will make progress towards moving that advertisement out of the queues. The sign of the delta thus is not changed. |
| PRE_WEIGHT | − | If the first advertisement has fewer remaining exposures in percentage terms, the delta is negative (i.e., favors the first advertisement). Since this means the first advertisement has been shown more often in percentage terms, it is desirable to favor the second advertisement to combat "starvation." The sign of the delta is therefore changed. |

The sort routine 701 sequentially processes pairs of advertisements in the current advertisement queue. For each pair, the sort routine 701 calculates the delta between the two advertisements for the various scheduling criteria. The deltas are then used to solve the hyperplane equation, with the sign of the result determining whether the order of the advertisements should be switched. The sort will continue until a complete pass is made through the current advertisement queue without having to switch the position of any advertisements.

The following example will illustrate the operation of the sorting routine 701 of the advertisement display scheduler 700. Assume the current advertisement queue contains three advertisements ordered as below and having the following characteristics:

| Advertisement | tte | tsls | me | pre |
|---|---|---|---|---|
| $MSG_1$ | 5 days | 1 hour | 100 | 40 |
| $MSG_2$ | 10 days | 5 hours | 10 | 90 |
| $MSG_3$ | 1 day | 24 hours | 20 | 50 |

Further assume that the weighting constants have been predefined to have the following values:

| | |
|---|---|
| TTE_WEIGHT ($c_1$) | 8 |
| TSLS_WEIGHT ($c_2$) | −1 |
| ME_WEIGHT ($c_3$) | 2 |
| PRE_WEIGHT ($c_4$) | −4 |

On the first pass of the sorting routine 701, $MSG_1$ and $MSG_2$ are compared to determine which should be presented first. Applying the above values for the scheduling criteria, the deltas are calculated as:

$$x_1 = (5-10) = -5$$
$$x_2 = (1-5) = -4$$
$$x_3 = (100-10) = 90$$
$$x_4 = (40-90) = -50$$

Inserting these deltas and the weighting constants in the hyperplane equation then yields the following:

$$\begin{aligned}pos &= ((-5) * 8) + ((-4) * (-1)) + (90 * 2) + ((-50) * (-4)) \\ &= (-40) + (4) + (180) + (200) \\ &= 344\end{aligned}$$

This positive result indicates that $MSG_2$ should be presented first, so the order of $MSG_1$ and $MSG_2$ will be reversed in the current advertisement queue. This reordering is consistent with the rationales expressed above for the signing of the weighting constants, since three of the four criteria favored presenting the second advertisement (here, $MSG_2$) before the first (here, $MSG_1$).

After switching the positions of $MSG_1$ and $MSG_2$, $MSG_1$ will be compared to $MSG_3$ to determine which should be presented first. Applying the same approach, the hyperplane equation yields the following result:

$$\begin{aligned}pos &= (4 * 8) + ((-23) * (-1)) + (80 * 2) + ((-10) * (-4)) \\ &= (32) + (23) + (160) + (40) \\ &= 255\end{aligned}$$

Once again, the positive result indicates the second advertisement (here, $MSG_3$) should be presented before the first advertisement (here, $MSG_1$). The position of the two advertisements will therefore be swapped in the current advertisement queue.

Thus, after the first pass of the sorting routine 701, the current advertisement queue appears as follows:

| Advertisement | tte | tsls | me | pre |
|---|---|---|---|---|
| $MSG_2$ | 10 days | 5 hours | 10 | 90 |
| $MSG_3$ | 1 day | 24 hours | 20 | 50 |
| $MSG_1$ | 5 days | 1 hour | 100 | 40 |

The sort routine 701 will continue making passes through the current advertisement queue until a complete pass is made where it is not necessary to swap any two advertisements. Thus, at the completion of the sort routine's processing, the advertisements in the current advertisement queue will appear in the optimal order in which they should be presented to a user. Once again, it should be noted that the foregoing is offered merely by way of example; the present invention does not rely on any particular sorting technique.

As the foregoing example demonstrates, the values assigned to the weighting constants (i.e., $c_0$–$c_4$) significantly impact the ultimate ordering of the advertisements. It has been found to be advantageous to designate one of the weighting constants (e.g., $c_2$) as a numeraire and set its value to "1". The other weighting constants may then be assigned exponentially increasing values based on their perceived importance. In this way, the most important scheduling criteria will have a proportionately greater impact on the ultimate ordering of the advertisements.

The particular values used in the representative embodiment were chosen to increase the probability of completing the maximum exposures for a given advertisement prior to the time the advertisement expires, thereby maximizing the revenue earned from the vendor who commissioned the advertisement. In effect, the advertisement display scheduler functions like a shortest-time-to-completion/first scheduled operating system. Persons skilled in the art will recognize, however, that other values may be equally or better suited for a given application in view of the particular characteristics of the advertisements, vendor requirements and billing considerations.

In the representative embodiment, the advertisement display scheduler 700 will continue to schedule a given advertisement until the advertisement is "expired" (i.e., its expiration date is passed) or is "exhausted" (i.e., its maximum exposures for the user are reached). In either case, the advertisement display scheduler 700 will remove the advertisement from its advertisement queue.

As noted above, the advertisement display scheduler 700 of the present invention may maintain a plurality of prioritized advertisement queues, including HIGH, MEDIUM, LOW and NO priority queues. In the event that none of the so-called "normal" priority queues (i.e., HIGH, MEDIUM and LOW) contains an advertisement, either because no advertisements have been received from the server system 104 or because all of the advertisements have expired or exhausted, the advertisement display scheduler 700 will sort and present advertisements from the NO_PRIORITY queue until a normal priority advertisement is received. The NO_PRIORITY queue can contain things like public service advertisements and the corporate logo of the e-mail service provider.

Once a normal priority advertisement is received by the advertisement display scheduler 700, that advertisement will generally be scheduled next and the NO_PRIORITY queue will not be returned to until the normal priority advertisement becomes expired or exhausted. Nevertheless, to avoid showing the same advertisement in succession when there is only one normal priority advertisement in the queues, the advertisement display scheduler 700 may show an advertisement from the NO_PRIORITY queue between two showings of the same single normal priority advertisement. In the event there are no advertisements remaining in any of the advertisement queues, including the NO_PRIORITY queue, the advertisement display scheduler may display a white background or some default advertisement.

Receiving Advertisements

In general, the advertisement display scheduler 700 of the present invention receives all of the advertisements it will show from the server system 104. For example, the server system 104 may transmit new banner advertisements and/or showcase advertisements to the client system 101 when a user goes on-line to retrieve e-mail messages as illustrated in FIG. 5. An initial set of advertisements may also be loaded along with the client system software to ensure that the user is shown advertisements even before the user goes on-line for the first time.

Advertisements may be transmitted according to any known data transfer technique and in any format, e.g., as bit map images. New advertisements are written to the storage device 206 and are processed by the new advertisement routine 703 of the advertisement display scheduler 700. In addition to display information, a new advertisement will include scheduling information such as its priority (e.g., HIGH, MEDIUM, LOW, NO), the maximum number of times the advertisement should be presented, and its expiration date. In the representative embodiment, advertisements are transferred to and stored at the client computer 101 in the form of advertisement archives. Each advertisement archive comprises information used to output an advertisement (e.g., bitmap information, position information, MPEG information, MIDI information, etc.) and advertisement control information. The advertisement control information for each advertisement includes information such as its priority (e.g., HIGH, MEDIUM, LOW, NO), the maximum number of times the advertisement should be presented, and its expiration date, and other parameters that can be used to control the scheduling of the output of advertisements. Each advertisement archive can also include an identification number or code for the advertisement.

Figure 8:
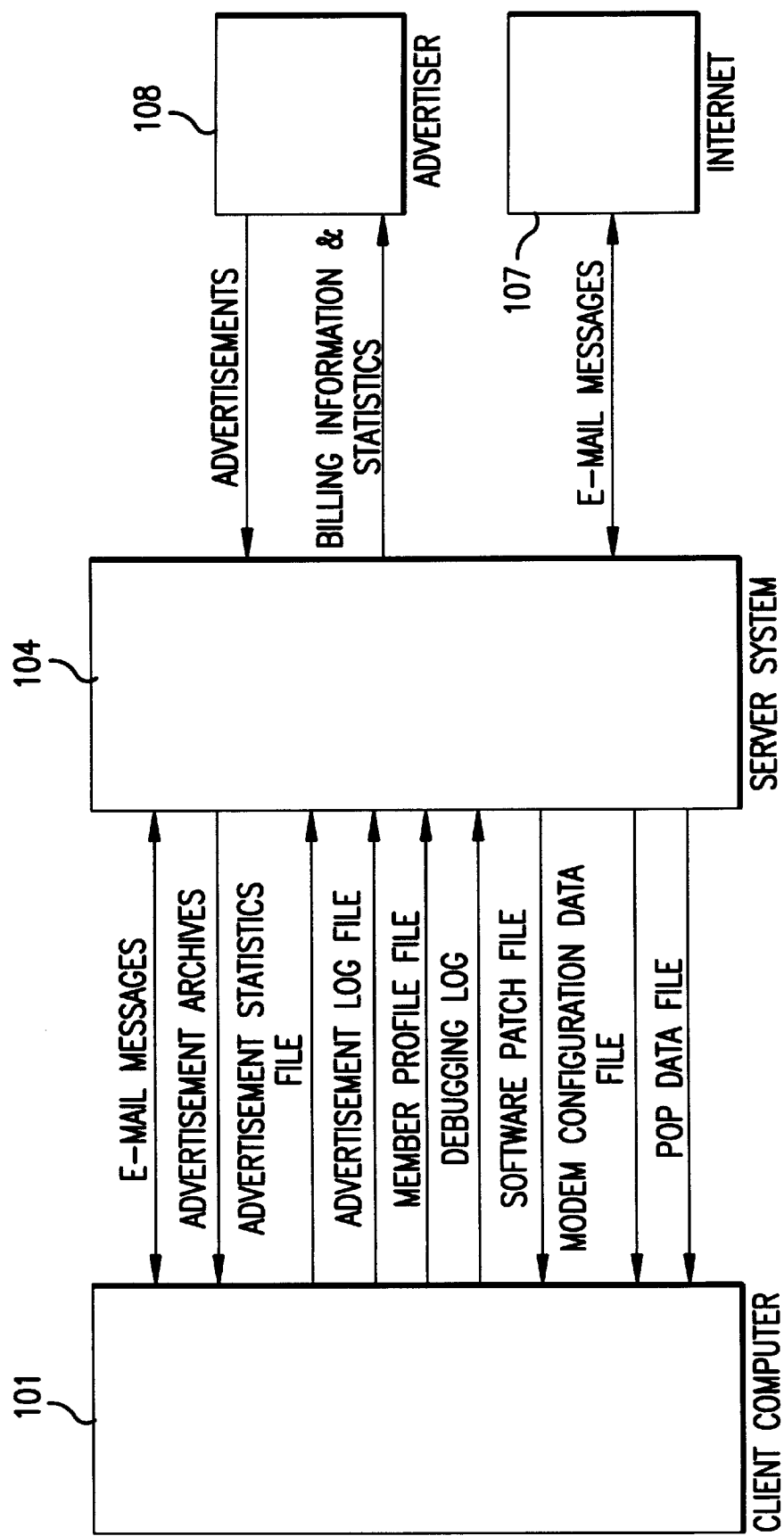
FIG. 8 describes the information that may be communicated between a client system and a server system according to an embodiment of the present invention.

FIG. 8 illustrates the information that may be communicated between the client system 101 and the server system 104 in an embodiment of the present invention. The server system 104 may receive advertisements from an advertiser 108.

When a normal priority advertisement is received during processing of a normal priority queue, the advertisement display scheduler will determine whether the new advertisement belongs in the current advertisement queue (i.e., if its priority matches the queue's priority). If so, the new advertisement routine 703 determines where in the current advertisement queue the new advertisement belongs. Starting with the advertisement immediately following the current advertisement, the new advertisement is sequentially compared with each advertisement in the current advertisement queue until one is found which the new advertisement should come before. The new advertisement routine 703 may invoke the sort routine 701 to accomplish this comparison using the above-described hyperplane equation, as described above. The new advertisement is then inserted into the current advertisement queue immediately before that advertisement. In effect, one round of the insertion sort is conducted to ensure that the portion of the current advertisement queue following the current advertisement remains sorted even after insertion of a new advertisement.

If a newly-received advertisement does not belong in the current advertisement queue, the new advertisement routine 703 simply inserts the advertisement at the bottom of the appropriate advertisement queue. The new advertisement will thus be sorted along with the other advertisements when that advertisement queue becomes the current advertisement queue.

If the newly-received advertisement is a "NO" priority advertisement, it is simply inserted at the end of the NO_PRIORITY queue even if that queue is the current advertisement queue and the sorting routine 701 is not invoked. Since these advertisements do not generate revenue for the e-mail service provider, it is relatively unimportant whether such advertisements are shown in exactly the right order every time the NO_PRIORITY queue is processed.

Logging Statistical Information

The advertisement display scheduler 700 can maintain statistics regarding each advertisement that it presents to a user. These statistics are kept in a statistics log file stored on the storage device 206 of the client system 101. Each time a new banner advertisement is displayed, for example, the advertisement display scheduler 700 updates the statistics log file with the identification of the banner advertisement, the time and date it was displayed, and the duration of the display. This information is then used by the advertisement display scheduler 700 in determining which advertisements to display subsequently, and can be used by the server system 104 for billing and reporting purposes. This information can also be used at the server system 104 by the advertisement distribution scheduler and the advertisement download scheduler. Similar statistics are maintained with respect to the presentation of showcase advertisements. The advertisement display scheduler 700 also can maintain an event log file containing information about various system activity including, for example, actions taken by the user (i.e., "clicking" on an advertisement), timeouts, and so on. Moreover, the server system 104 may send billing information and statistics to the advertiser 108.

It will be appreciated that advertisements may also include community service messages, system information messages, colorful and pleasing artwork, photographic works, logos, slogans and the like. The term advertisement includes content that is other than e-mail messages to and from users of the e-mail system. Advertisements can include text, graphics, sound, animations, video, etc. Thus, it will be appreciated that the advertisement display scheduler 700 can be used to schedule the output of these formats of advertisements.

The advertisement distribution scheduler is located at the server system 104. The advertisement distribution scheduler generates an assignment of advertisements to users and their computers. For example, a particular advertisement for orange juice may be assigned by the advertisement distribution scheduler to all residents of New York City and all college students in Boston. Each advertisement has associated with it an ad contract which specifies a demographic profile reach and frequency, duration and time of expiry for the advertisement. The ad contract can be stored in the database management system 106. Using the information about each user received by the server system 104, the advertisement distribution scheduler assigns advertisements to users. In the representative embodiment, the advertisement distribution scheduler uses information received from the user via the member profile that is stored in the database management system 106 to allocated advertisements. Demographic information collected from other sources can also be used by the advertisement distribution scheduler. Thus, the advertisement distribution scheduler runs database selects on the user demographic information stored in the database management system 106 to produce a list of users for each advertisement.

The advertisement distribution scheduler includes additional functionality that assists in the maximization of advertisement revenues and the minimization of system costs. For example, for each selected user, the advertisement distribution scheduler reviews (1) the usage profile of the user (e.g., statistical information collected in the statistics log file at the user's computer 101) to ascertain expected advertisement consumption over a predetermined period; and (2) the current advertisement load of the user and time to expiry. Thus, advertisements can be allocated to users who are more likely to be exposed to the advertisements prior to the expiration period of the advertisement.

Thus, given an ad contract, the advertisement distribution scheduler computes a set of assignments of advertisements to users that maximizes potential revenues. Because more than one user may operate a particular client system 101 (e.g., members of a family, employees of a corporation), allocation of advertisements can be aggregated for each client system 101 so that an advertisement need only be transferred once to a client system 101 if more than one user at that client system 101 has been allocated the advertisement. The advertisement distribution scheduler generates an advertisement archive for each client system 101. The advertisement archive can be stored (directly or indirectly) on the mail server $M_0 \ldots M_n$ assigned to that client system 101.

Optionally, the advertisement distribution scheduler can assign advertisements to users on a machine basis rather than a user basis. Thus, the usage profile and current advertisement load discussed above can be aggregated and considered by the advertisement distribution scheduler on a per machine rather than per user basis.

The advertisement download scheduler is located at the server system 104. The advertisement download scheduler controls the transfer of advertisements from a mail server $M_n$ to a client system 101. At any moment in time, each client system 101 has a given number of advertisements that actually have been downloaded to the client system 101 and a given number of advertisement eligible for download (as determined by the advertisement distribution scheduler) that are stored on a mail server $M_n$. Upon any given connection between the client system 101 and the server system 104, the advertisement download scheduler decides which of the advertisements (e.g., the advertisement archives) that are stored on the mail server $M_n$, if any, are actually downloaded at that time.

The advertisement download scheduler aims to maximize revenue by optimizing for the number of exposures of an advertisement before expiry of that advertisement. For example, it may not be optimal to download an advertisement one day before expiry if another advertisement can be downloaded that has a week until expiry or to download an advertisement if the user has previously received but not been exposed to many current advertisements. The advertisement download scheduler also aims to spread the advertisement load over all users of a given client system 101.

The advertisement download scheduler delivers advertisements in a timely fashion without overloading any given user, but in a way that maximizes the number of exposures an advertisement can receive before it expires. It is noted that it may be suboptimal to download an advertisement with a large amount of time remaining for its delivery by the advertisement display scheduler 700.

Moreover, the advertisement download scheduler will aim to spread downloading of advertisements during any one connection between the client system 101 and the server system 104. Thus, it is believed preferable to have one advertisement transferred each connection, rather than having four advertisements transferred in a first connection and none in a subsequent three connections. A parameter used in this decision process can also include the number of e-mail messages to be transferred and the transfer time.

In the representative embodiment, each advertisement has associated with it scheduling information that can be used by the advertisement download scheduler to make decisions as to the order and timing of the download of eligible advertisements.

For a given advertisement load assigned to a particular client system 101, the advertisement download scheduler determines which advertisements should be downloaded in an expected time period (e.g., the next week) and determines the fraction for the given connection based on the percentage of connect time that the current user represents according to historical information about that user's habits (e.g., as stored in the database management system 106). This spreading attempts to share the burden of advertisement downloading amongst all users of a particular client system 101.

The three schedulers of the present invention operate together in an integrated fashion to maximize exposures of relevant advertisements and to minimize system operation costs.

The present invention has been described in the context of a representative embodiment in which users received e-mail service in exchange for being exposed to vendor advertising. Persons skilled in the art will recognize, however, that the present invention is applicable to any system in which it is desirable to present computer users with a continuously-changing variety of advertisements, particularly while the user is operating the computer that is not connected to a remote server. The principles of the present invention apply to on-line services that present advertising to users while the user is accessing other content. Thus, an e-mail message may be regarded as an example of content provided to a user.

Moreover, while the present invention has been described with reference to representative embodiments having specific features, persons skilled in the art will recognize that many modifications and variations are possible. Accordingly, the present invention embraces all alternatives, modifications and variations that fall within the spirit and scope of the appended claims, as well as all equivalents thereof.

What is claimed is:

1. An apparatus for scheduling the presentation of advertisements on a computer monitor, said apparatus comprising:
    (a) an advertisement queue stored in a memory, said advertisement queue containing a plurality of advertisements having a display portion and a control portion;
    (b) an advertisement sort module for ordering said plurality of advertisements in said advertisement queue according to information contained in said control portion of said advertisements; and
    (c) an advertisement display module for sequentially presenting said display portion of said advertisements on the computer monitor.

2. The apparatus of claim 1 further comprising a plurality of advertisement queues each having associated therewith a unique priority, wherein each of said plurality of advertisements is stored in one of said plurality of advertisement queues according to said control information.

3. The apparatus of claim 2 further comprising means for connecting to a remote computer system to receive said plurality of advertisements and wherein said the advertisement display module comprises means for presenting said advertisements on the computer monitor when not connected to the remote computer system.

4. An advertisement scheduler for presenting a plurality of advertisements on a computer monitor, said advertisement scheduler comprising:
    (a) a communications interface enabling said advertisement scheduler to receive an advertisement transmitted from a remote source over a computer network;
    (b) an advertisement processor for assigning a received advertisement to one of a plurality of prioritized advertisement queues; and
    (c) an advertisement display module for designating one of said prioritized advertisement queues as a current advertisement queue and sequentially presenting one or more advertisements in said current advertisement queue on the computer monitor.

5. The advertisement scheduler of claim 4 further comprising a sort module for reordering said advertisements in said current advertisement queue according to a predetermined scheduling parameter.

6. The advertisement scheduler of claim 4 wherein said advertisement display module operates to present said one or more advertisements on the computer monitor when the advertisement scheduler is not connected to said computer network.

7. The advertisement scheduler of claim 4 wherein said advertisement processor comprises means for deleting a first advertisement from said prioritized advertisement queues if said first advertisement is designated as conflicting with a second advertisement in said prioritized advertisement queues.

8. A scheduling system for outputting advertisements to a user of an electronic mail system, the electronic mail system having a user component and a server component capable of communicating with one another over a computer network, said scheduling system comprising:
    (a) a communications interface enabling said scheduling system to receive advertisements transmitted from the server component of the electronic mail system, wherein each of said transmitted advertisements includes scheduling information;
    (b) an advertisement processor for assigning each of said plurality of advertisements to one of a plurality of prioritized advertisement queues based on said scheduling information, wherein each of said prioritized advertisement queues may contain a plurality of stored advertisements;
    (c) an advertisement output module for designating one of said prioritized advertisement queues as a current advertisement queue, sorting said plurality of stored advertisements in said current advertisement queue according to said scheduling information and sequentially outputting each of said stored advertisements in an order determined by said sorting.

9. The scheduling system of claim 8 wherein said plurality of prioritized advertisement queues are stored locally in a memory coupled to the user component of the electronic mail system.

10. The scheduling system of claim 9 wherein said advertisements are received from the server component and output to the user independently of electronic mail advertisements.

11. The scheduling system of claim 10 wherein the electronic mail system is disabled if one of said plurality of prioritized advertisement queues is altered in any manner by other than by the scheduling system.

12. The scheduling system of claim 10 wherein said scheduling system monitors the user component and terminates said output of advertisements when the user component is inactive for a predetermined period of time.

13. A method for displaying a plurality of advertisements on a computer monitor, wherein each of the plurality of advertisements includes a display portion and a control portion, said method comprising:
    (a) assigning each of the plurality of advertisements to one of a plurality of prioritized advertisement queues according to a priority code contained in the control portion of the advertisement, wherein each of said prioritized advertisement queues is associated with a unique priority;

(b) designating one of said plurality of prioritized advertisement queues having a highest priority as a current advertisement queue;

(c) sorting the advertisements in said current advertisement queue according to a scheduling code contained in the control portion of the advertisement;

(d) sequentially displaying each of the advertisements in said current advertisement queue on the computer monitor; and (e) repeating steps (b) through (d) to sequentially display the advertisements in each of said plurality of prioritized advertisement queues, wherein said prioritized advertisement queues are processed in an order of decreasing priority as determined by said unique priority codes associated therewith.

14. The method of claim 13 wherein said sorting step comprises determining which of a first advertisement and a second advertisement has a higher priority by comparing a set of scheduling parameters associated with said first advertisement to a corresponding set of scheduling parameters associated with said second advertisement.

15. The method of claim 14 wherein said sorting step further comprises calculating a set of delta values representing differences between said scheduling parameters of said first advertisement and corresponding scheduling parameters of said second advertisement.

16. The method of claim 15 wherein said sorting step further comprises solving a hyperplane equation using said set of delta values and a corresponding set of scheduling constants to identify which of said first and second advertisements has the higher priority.

17. The method of claim 16 further comprising a step of updating said control portion of an advertisement after said advertisement is displayed.

18. The method of claim 17 wherein said set of scheduling parameters includes a date after which an advertisement can no longer be displayed.

19. The method of claim 17 wherein said set of scheduling parameters includes a maximum number of times an advertisement may be displayed.

20. The method of claim 19 wherein said set of scheduling parameters includes a percentage of said maximum number of times that an advertisement has already been displayed.

21. The method of claim 17 wherein said set of scheduling parameters includes a period of time since an advertisement was last displayed.

22. The method of claim 21 wherein said advertisements comprise sound information.

23. A method for displaying advertisements to a user of an electronic mail system, the electronic mail system having a user component and a server component capable of communicating over a computer network, said method comprising:

(a) transmitting a plurality of data packets from the server component of the electronic mail system to the user component, wherein each of said data packets includes an advertisement and associated scheduling information;

(b) storing each of said data packets in one of a plurality of advertisement queues based on said scheduling information;

(c) designating one of said advertisement queues as a current advertisement queue;

(d) sorting said data packets in said current advertisement queue based on said scheduling information;

(e) sequentially displaying each of said advertisements in said current advertisement queue to the user;

(f) updating said scheduling information for each of said advertisements displayed; and (f) repeating steps (c) through (f) to display said advertisements in each of said advertisement queues.

24. The method of claim 23 further comprising a step of logging statistical information relating to said sequential display of advertisements.

25. The method of claim 24 further comprising a step of periodically transmitting said statistical information from said user component to said server component.

26. The method of claim 25 wherein said server component uses said statistical information to bill a sponsor of an advertisement.

27. A method for displaying advertisements to a user of an electronic mail system, the electronic mail system having a user component and a server component capable of communicating over a computer network, said method comprising:

(a) establishing a network connection between the user component and the server component;

(b) transmitting a plurality of data packets from the server component to the user component, wherein each of said data packets includes an advertisement and associated scheduling information;

(c) storing each of said data packets in one of a plurality of prioritized advertisement queues based on said scheduling information, wherein said prioritized advertisement queues reside in a local memory coupled to the user component;

(d) designating one of said prioritized advertisement queues as a current advertisement queue;

(e) sorting said data packets in said current advertisement queue based on said scheduling information;

(f) sequentially displaying each of said advertisements in said current advertisement queue to a user when no network connection is established between the user component and the server component; and (g) repeating steps (c) through (f) to continuously display said advertisements in each of said prioritized advertisement queues.

28. The method of claim 27 further comprising a step of updating said scheduling information of an advertisement to reflect a display of said advertisement to the user.

29. The method of claim 28 further comprising a step of logging statistical information relating to said sequential display of advertisements.

30. The method of claim 29 further comprising a step of periodically transmitting said statistical information from said user component to the server component.

31. The method of claim 27 further comprising a step of displaying an advertisement to a user while a network connection is being established between the user component and the server component.

32. The method of claim 31 further comprising a step of displaying an advertisement to a user while the server component is transmitting data packets to the user component.

33. The method of claim 31 further comprising a step of displaying an advertisement to a user concurrently with, but independently of, the server component downloading an electronic mail advertisement to the user component.

34. A method for displaying advertisements to a user of an electronic mail system, the electronic mail system having a user component and a server component capable of communicating over a computer network, said method comprising:

(a) establishing a network connection between the user component and the server component;

(b) transmitting a plurality of data packets from the server component to the user component, wherein each of said data packets includes an advertisement, an advertisement type indicator, and associated scheduling information;

(c) storing each of said data packets in one of a first and second set of queues based on said advertisement type indicator, said first set of queues comprising a plurality of prioritized advertisement queues for data packets having a first advertisement type, wherein said data packet is assigned to one of said plurality of prioritized advertisement queues based on said scheduling information, and said second set of queues comprising one or more advertisement queues for data packets having a second advertisement type;

(d) designating one of said plurality of prioritized advertisement queues as a current advertisement queue;

(e) sorting said data packets in said current advertisement queue based on said scheduling information;

(f) sequentially displaying each of said advertisements in said current advertisement queue to a user; and (g) repeating steps (c) through (f) to continuously display said advertisements in each of said plurality of prioritized advertisement queues while the user is operating the user component of the electronic mail system.

35. The method of claim 34 wherein said advertisements are displayed to the user while no network connection is established between the user component and the server component.

36. The method of claim 35 further comprising a step of sequentially displaying said advertisements in said second set of queues while said network connection between the user component and the server component is being established.

37. The method of claim 36 further comprising a step of sequentially displaying said advertisements in said second set of queues while a data packet is being transmitted from the server component.

38. The method of claim 37 further comprising a step of displaying an advertisement to a user concurrently with, but independently of, the server component downloading an electronic mail advertisement to the user component.

39. An advertisement scheduling system to schedule the transfer and output of advertisements in a computer network, the computer network including a server system and a plurality of user computers capable of connecting to and disconnecting from the server system, comprising:

an advertisement distribution schedule, located at the server system, determining, for each advertisement, which user computers are eligible to receive said advertisement, and thereafter associating said advertisements with each eligible user computer;

an advertisement download scheduler, located at the server system, determining when to transmit advertisements to eligible user computers;

a memory device, located at each one of said user computers, to store advertisements transmitted from the server system; and an advertisement display scheduler, located at each one of said user computers, determining when to output advertisements stored on the memory device of said user computer.

40. The system of claim 39 wherein advertisements are output at said user computers when said user computers are not connected to the server system.

41. The system of claim 39 further comprising, at the server system, a plurality of e-mail servers.

42. The system of claim 41 further comprising, at the user computers, means for reading e-mail and means for writing e-mail, and wherein the advertisements are output at said user computers when said user computers are enabling users to read e-mail and write and when not connected to the server system.

43. A method for outputting advertisements received from a remote computer at a user computer, comprising the steps of:

providing a priority queue at the user computer for prioritizing advertisements;

electronically receiving an advertisement from the remote computer over a communications link;

storing the received advertisement on a memory device of the user computer;

at the user computer, allocating the advertisement to the priority queue;

determining if the received advertisement conflicts with a second advertisement on the priority queue, and if so, deleting the second advertisement from the priority queue; and outputting the advertisement at the user computer according to said advertisement's position on the priority queue.

44. The method of claim 43 wherein each advertisement comprises an advertisement archive including information identifying conflicting advertisements.

45. The method of claim 44 further comprising the step of replacing the deleted second advertisement on the priority queue after a predetermined period of time.

46. The method of claim 45 wherein the predetermined period of time is one pass through the priority queue.

47. The method of claim 43 wherein the step of outputting the advertisement further comprises the step of retrieving the advertisement from the memory device of the user computer.

48. The method of claim 43 wherein the step of outputting the advertisement occurs when the user computer is not connected to the remote computer.

* * * * *